United States Patent

[11] 3,600,614

| [72] | Inventor | Ian F. M. Curtis<br>Farnborough, England |
|---|---|---|
| [21] | Appl. No. | 875,391 |
| [22] | Filed | Nov. 10, 1969 |
| [45] | Patented | Aug. 17, 1971 |
| [73] | Assignee | The Solartron Electronic Group Limited<br>Farnborough, England |
| [32] | Priority | Nov. 18, 1968 |
| [33] | | Great Britain |
| [31] | | 54706/68 |

[54] FORCE TRANSDUCER WITH ELONGATE VIBRATING MEMBER
21 Claims, 3 Drawing Figs.

[52] U.S. Cl. ........................................................ 310/25,
73/398, 318/129
[51] Int. Cl. ...................................................... H02k 35/00
[50] Field of Search .......................................... 310/25, 15,
17, 21, 29, 32, 8.5—8.8; 318/129, 124, 126—128,
130; 73/393, 398, 70.2, 67.2, 67.4, 141

[56] References Cited
UNITED STATES PATENTS

| 2,510,073 | 6/1950 | Clark ........................... | 310/25 X |
| 2,428,671 | 10/1947 | Kent et al. ................... | 73/70.2 |
| 1,573,739 | 2/1926 | O'Neill ........................ | 310/25 |
| 2,498,990 | 2/1950 | Fryklund ..................... | 310/17 X |
| 2,548,062 | 4/1951 | Reger .......................... | 310/21 X |
| 2,050,674 | 8/1936 | Stover ......................... | 73/67.2 UX |
| 3,181,016 | 4/1965 | Rosenman .................... | 310/8.6 X |
| 3,093,761 | 6/1963 | Case ............................ | 310/28 |
| 3,242,738 | 3/1966 | Bellier ......................... | 73/393 |

FOREIGN PATENTS

| 884,122 | 7/1953 | Germany ...................... | 310/15 |

Primary Examiner—Milton O. Hirshfield
Assistant Examiner—B. A. Reynolds
Attorneys—William R. Sherman, Stewart F. Moore, Jerry M. Presson and Roylance, Abrams, Berdo and Kaul

ABSTRACT: A force transducer in which a strut is fixed at one end and has the other end coupled to an arrangement for applying force in the axial direction of the strut. In operation, transverse vibration of a length of the strut is maintained by feedback from a pickup coil to a drive coil through an amplifier, the frequency being a measure of the axial force to which the strut is subjected. Adjacent the said other end a node is formed by a clamp gripping a portion of the strut. This clamp includes rolling bearings arranged to permit axial movement of the gripped portion of the strut.

3,600,614

FORCE TRANSDUCER WITH ELONGATE VIBRATING MEMBER

BACKGROUND OF THE INVENTION

This invention relates to force transducers, and more particularly to force transducers which when operating produce a signal in the form of a frequency which is representative of the force acting on the transducer. Such transducers find application in, amongst other things, the measurement of fluid pressure, the adaption of a force transducer to fluid pressure measurement being achieved by the incorporation of an arrangement for integrating fluid pressure over a constant area.

One known form of force transducer adapted for fluid pressure measurement is disclosed in U.S. Pat. Specification No. 3,242,738. This known transducer employs as a vibratory element a stretched wire anchored to a rigid frame at one end and secured to a flexible diaphragm at the other end so that deflection of the diaphragm changes the tension in the wire. One serious disadvantage of such an arrangement is that the stretched wire is continually under tension with the result that creep takes place in the wire and necessitates frequent recalibration.

In U.S. Pat. Specification No. 3,529,470 there is described a force transducer in which two struts are secured to one another at their ends and provided with means for maintaining transverse vibration of the struts in antiphase with one another, the frequency of vibration being representative of force applied to the struts jointly in the direction of their longitudinal axes. Since the two struts must have identical natural frequencies when in a common environment and state of stress, their mechanical properties must be carefully matched. This is, however, difficult where materials other than homogeneous quartz is used and is especially difficult with metals as work hardening leads to different elasticities.

It is therefore an object of the present invention to avoid the disadvantages and difficulties encountered in the prior art force transducers using vibratory elements.

SUMMARY OF THE INVENTION

Briefly described, an embodiment of the present invention includes an elongate member, which is preferably a strut, having a length thereof arranged for transverse vibration between first and second transverse-node-forming structures, one portion of the said member being fixed at the first structure and another portion being located for axial movement at the second structure. The second transverse-node-forming structure incorporates two or more rotatable members arranged to roll when the said other portion moves relative to the said one portion in the axial direction of the said member. Means are provided for exciting transverse vibration of the said length and for supplying a signal representative of a characteristic, preferably the frequency, of the transverse vibration.

The rotatable members may be rollers with their axis lying in planes to which the longitudinal axis of the said member is perpendicular.

Advantages of a transducer embodying the present invention are that the transverse nodes are sharply defined and the internal static friction and hysteresis is very small.

A preferred embodiment of the invention will now be described, solely by way of example, with reference to the accompanying drawings.

Figure 1:
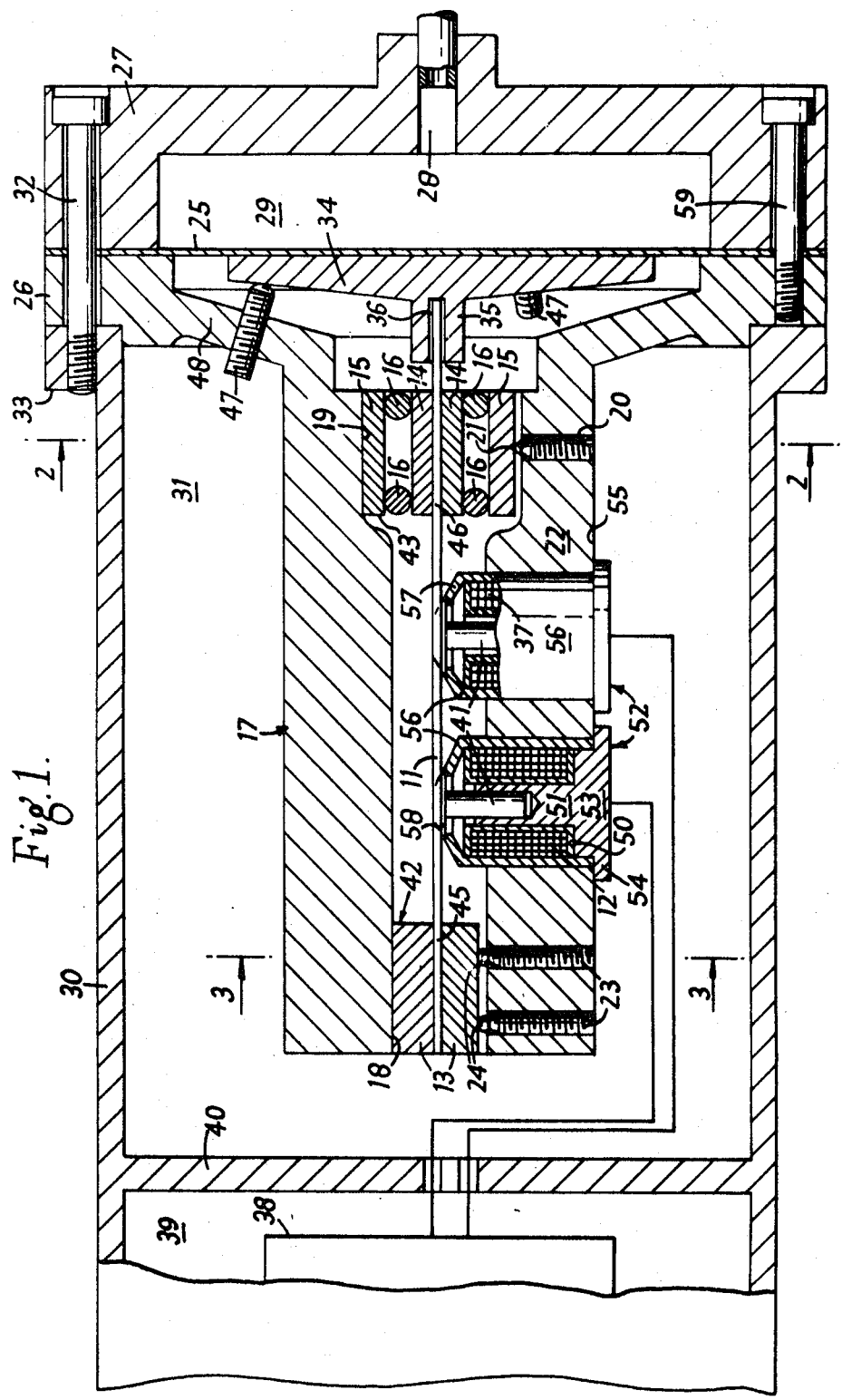
FIG. 1 is a longitudinal sectional view of a force transducer embodying the invention in a preferred form.

The transducer shown in FIG. 1 is responsive to force applied to a stiff but resilient elongate member in the form of a strut 11 of a ferromagnetic stainless alloy Ni-Span-C 902 (Registered Trade Mark). Magnetic means incorporating a drive coil 12 are provided for exciting transverse vibrations of a length of the strut 11, the said length extending from a pair of rectangular blocks 13 between which an end portion of the strut 11 is clamped to another pair of rectangular blocks 14 which grip another portion of the strut.

Each block 14 is spaced from a respective similar block 15 by a pair of cylindrical bars 16. The bars 16 all have the same length and diameter.

One of the blocks 13 bars against an internal surface 18 of a frame 17, and one of the blocks 15 bears against another internal surface 19 of the frame 17. The strut 11 is of rectangular cross section and the opposed faces of the blocks 13 and of the blocks 14 bear against the wider side faces of the strut.

Figure 2:
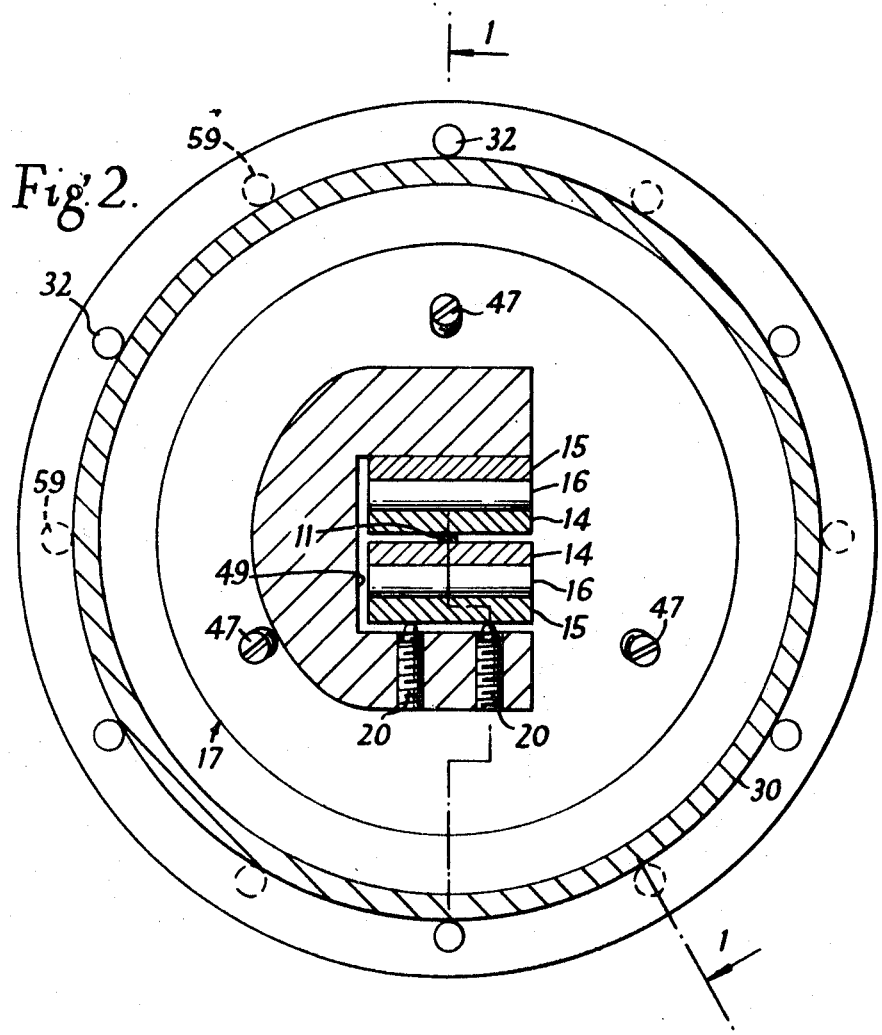
FIG. 2 is a transverse, partly sectional view of the transducer shown in FIG. 1.

Two cap-pointed setscrews 20 with respective bearing balls 21 at their points are screw threadedly engaged in apertures in a wall 22 of the frame 17, only one such screw being visible in FIG. 1 since their axes lie in a plane to which the axis of the strut 11 is perpendicular (see FIG. 2). The points of contact of the balls 21 with the respective block 15 lie on a line which is parallel to and equidistant from axes of the bars 16 so that frame 17, the blocks 14 and 15, the bars 16 and the setscrews 20 form a balanced clamping arrangement for forming a node in the transverse vibrations of the strut 11 set up during operation.

Another pair of cap-pointed setscrews 23 with bearing balls 24 are screw threadedly engaged in apertures in the wall 22 with their axes lying in a plane parallel to and including the axis of the strut 11 so that the frame 17, the blocks 13 and the screws 23 form another balanced clamping arrangement for forming a node in the transverse vibrations of the strut 11 set up during operation.

A metal diaphragm 25 is clamped between a circular flange 26 on the frame 17 and the circular rim of a caplike closure 27. An inlet port 28 for fluid is provided at the center of the flat wall of the closure 27. Thus a chamber 29 for fluid is formed. A cylindrical housing 30 has a compartment 31 in which the frame 17 is mounted by means of its flange 26 and six bolts 32 which pass through the cylindrical wall of the closure 27 and the flange 26 and are screw threadedly engaged in an external flange 33 formed on the housing 30. The compartment 31 is sealed by the diaphragm 25 and is evacuated so that any fluid pressure in the chamber 29 forces the diaphragm against a disc 34.

The disc 34 is provided with a centrally disposed integral stub shaft 35 having a coaxial bore 36 of circular cross section formed therein. One end of the strut 11 is rigidly secured in the bore 36, the strut being tight in the bore and epoxy resin being used to fill the space remaining in the bore and thus to secure the strut to the disc 34.

In operation, force acting on the diaphragm 25 as a result of fluid pressure in the chamber 29 is transmitted to the strut 11 by the disc 34, the force transmitted acting in the axial direction of the strut 11.

Further magnetic means incorporating a pickup coil 37 are provided for supplying a signal representative of the frequency of transverse vibrations of the said length of the strut 11 set up during operation. This signal is supplied to the input of an amplifier 38 mounted in another compartment 39 of the housing 30, the compartments 31 and 39 being separated by an internal wall 40 of the housing. The output of the amplifier 38 is connected to the drive coil 12. The leads from the pickup coil 37 and the drive coil 12 are connected to the amplifier 38 through respective electrically insulative glass-to-metal seals in the wall 40.

The axes of the coils 12 and 37 are perpendicular to the axis of the strut 11 and lie in a plane which is parallel to the narrower side faces of the strut.

The drive-coil 12 and the pickup coil 37 are provided with respective permanent-magnet cores 41, the core 41 of the drive coil 12 prevents frequency doubling occurring in the varying magnetic field applied to the strut 11 by the drive coil 12 during operation. The core 41 of the pickup coil 37 provides the magnetic flux to be cut by transverse vibration of the strut 11. It is arranged that when the said length of the strut 11 is vibrating transversely at its fundamental frequency in a plane parallel to its narrower side faces, the feedback from the pickup coil 37 through the amplifier 38 to the drive coil 12 maintains the vibration. In operation, an electromotive force is induced in the pickup coil 37 by the transverse vibration of the strut 11, and electromotive force being proportional to and in phase with the transverse velocity of that portion of the strut 11 which forms part of a magnetic circuit with the respective core 41 of the coil 37. The phase shift produced by the amplifier 38 is arranged to be such that varying magnetic flux produced by the drive coil 12 is in phase with the electromotive force induced in the pickup coil 37 so that the force acting on the portion of the strut 11 which forms part of a magnetic circuit with the respective core 41 of the drive coil 12 is in phase with the transverse velocity of the aforesaid portion associated with the pickup coil 37. With these relationship resonance can occur, the effect of viscous damping being eliminated thereby.

The design of a suitable amplifier will be obvious to those skilled in the art.

The points of intersection of the axes of the coils 12 and 37 with the axis of the strut 11 are at approximately three-tenths of the perpendicular distance from the plane of a face 42 of one block 13 to the plane of a face 43 of one block 15. Consequently the phase shift of the feedback from the pickup coil 37 to the drive coil 12 inhibits the appearance of the second harmonic of transverse vibration of the said length.

It is found that the nodes formed respectively between the blocks 13 and the blocks 14 are located in the portions of the strut held between the blocks at a small distance from the edges of the blocks, such points being illustrated at 45 and 46.

In the present embodiment the transducer responds to axially directed force which tends to compress the strut 11, the disc 34 moving leftwards in FIG. 1. Such movement of the disc 34 causes the end of the strut secured thereto to move likewise and consequently the blocks 14 move leftwards with the portion of the strut 11 therebetween. At the same time the bars 16 roll leftwards on the blocks 15 under the drive communicated thereto by the blocks 14. Since the bars 16 are free to roll when the blocks 14 move in the axial direction of the strut 11, there is no sliding between the bars 16 and the blocks 14 and no sliding between the bars 16 and the blocks 15. Similarly, when the axially directed force is removed, the end of the strut secured to the disc 34 and the portion of the strut between the blocks 14 move rightwards carrying the blocks 14 and rolling the bars 16 back to the positions shown in FIG. 1. In the movement described, the resilience of the strut 11 opposes the force applied to the disc 34 and the strut flexes between the two node-forming clamping arrangement to balance the force.

Three setscrews 47 threaded through a conical wall 48 of the frame 17 are provided as limit stops to prevent the disc 34 from being forced leftwards beyond the point at which the strut 11 would be bent permanently.

Figure 3:
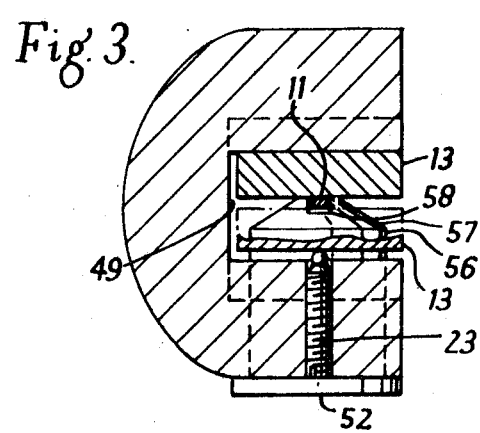
FIG. 3 is another transverse, partly sectional view of the transducer shown in FIG. 1.

From FIG. 2, which is a cross-sectional view of part of the frame 17 taken at the line 2-2 in FIG. 1, it can be seen that there is a clearance between the blocks 14 and 15 and the bars 16 on the one hand and an internal face 49 of the frame 17. FIG. 3, which is a cross-sectional view of another part of the frame 17, taken at the line 3-3 in FIG. 1, shows a corresponding clearance between the blocks 14 on the one hand and the face 49 on the other hand is necessary to enable the bars 16 and the blocks 14 to move without sliding against the frame 17 at the face 49. A shim is placed in contact with the face during assembly to enable this necessary clearance to be provided and it is convenient for the blocks 13 and 15 to have the same clearance. Furthermore, since the block 13 in contact with the balls 24 and the block 15 in contact with the balls 21 must be movable by the screws 23 and 20 respectively relative to the face 49, friction between that face and these two blocks is eliminated by the clearance.

Referring again to FIG. 1 it will be seen that the drive coil 12 is wound on a former 50, which is of insulating material, that is located coaxially on a cylindrical pillar 51 of a ferromagnetic support 52. The support 52 includes a short cylindrical base 53 provided with a flange 54 which serves to define the positions of the coil 12 and the core 41 relative to an external face 55 of the frame 17 by abutting against the face 55. A ferromagnetic cylindrical shell 56 which is open at one end and partially closed at the other end by a conical wall 57 is fitted at its open end on the base 53.

The conical wall 57 is truncated and apertured to reveal one end of the core 41, and has a groove 58 of rectangular cross section formed across the aperture to receive a portion of the strut 11 with a clearance to allow the strut to vibrate transversely as aforesaid without striking the conical wall 57. The disposition of the strut 11 in the groove 58 is shown more clearly in FIG. 3.

This arrangement of the shell 56, the core 41 and the strut 11 at the groove 58 results in there being very little stray magnetic field during operation, the core 41, the support 52, the shell 56 and the strut 11 forming substantially a closed magnetic circuit apart from the small clearances between the strut, the core and the conical wall 57.

A corresponding support 52 and shell 56 are provided for the coil 37 as shown in FIG. 1.

Since the magnetic fields associated with the coils 12 and 37 and their respective cores 41 are confined to the portions of the strut 11 passing through the grooves 58, there is substantially no direct coupling between the coils 12 and 37.

The fundamental frequency at which the said length of the strut 11 vibrates transversely as aforesaid varies with the force acting axially on the strut. A smooth curve can be plotted for this frequency as a function of the axial force, the curve passing smoothly from the condition in which the force tends to stretch the strut to the condition in which the force tends to compress the strut. However, in the embodiment shown in the drawings, only compressive force can be transmitted to the strut 11. The clamping arrangement including the blocks 13 and the screws 23 is used in tuning the strut 11 to a datum frequency without disturbing the clamping arrangement including the bars 16. Evacuation of the compartment 31 reduces the damping of the vibrations, and the choice of material of the strut 11 can be such as to remove or reduce the effects of variation in temperature.

The blocks 13, 14 and 15 and the bars 16 are of tungsten carbide or other hard material.

Preferably it is arranged that thermal variations do not introduce a change in the fundamental frequency of vibration of the transverse vibrations. Since the diaphragm 25 has a finite stiffness it is preferable that there should be no difference between thermal expansion of the strut 11 parallel to its longitudinal axis and thermal expansion of the frame 17 in the same direction relative to the end of the strut in the bore 36. The existence of a difference between these expansions with change in temperature results in a change in the axial loading of the strut 11 with change in temperature. Where the strut is of Ni-Span-C 902, the frame 17 and the disc 34 can be titanium. Ni-Span-C 902 is an iron-nickel-chromium alloy produced by the Huntingdon Alloy Products Division of the International Nickel Company, Incorporated, of Huntingdon, West Virginia, and has the following limiting chemical composition:

Nickel (plus cobalt)   41.0 to 43.50 percent
Chromium   4.90 to 5.75 percent
Titanium   2.20 to 2.75 percent
Aluminum   0.30 to 0.80 percent
Carbon   0.06 maximum percent
Manganese   0.08 maximum percent
Silicon   1.00 maximum percent
Sulfur   0.04 maximum percent
Phosphorus   0.04 maximum percent
Iron   Remainder The housing 30 and the closure 27 are of stainless steel. The port 28 in the closure 27 is preferably provided with a construction which allows fluid to pass but prevents wire being inserted into the chamber 29 and damaging the diaphragm 25. For example the port 28 may be screw threaded and have screwed therein a screw threaded plug having a groove in one end face and a groove running through the thread on the plug, the grooves communicating so as to form a passage for fluid from one end of the plug to the other, and a shoulder being provided in the port 28 at the junction of the two grooves to block direct passage of a wire from the groove through the thread on the plug to the chamber 29. Alternatively a filter may be installed in the port 28. The diaphragm 25 in one embodiment constructed as shown was one-thousandth of an inch in thickness. Six bolts 59 passing through apertures in the cylindrical wall of the closure 27 are screw threadedly engaged in the flange 26 to clamp the periphery of the diaphragm 25 between the flange 26 and the rim of the cylindrical wall of the closure 27. A thin film of epoxy resin is used to render the junction between the closure 27, the diaphragm 25, the flange 26 and the flange 33 fluidtight.

In an embodiment constructed as described hereinbefore and intended for use in measuring gas pressure the strut 11 was between 1 and 1.1 inches long, 24 thousandths of an inch thick and between 35 and 40 thousandths of an inch wide.

If the compartment 31 is not evacuated but is open to ambient or provided with a reference pressure, it may be desired to secure the diaphragm 25 to the disc 34. To effect such securing a ring may be bolted to the periphery of the right-hand face of the disc 34 so as to clamp the diaphragm 25 therebetween.

The output of the amplifier 38 is, in addition to being connected to the drive coil 12, also connected to a frequency meter so that the frequency of vibration of the said length of the strut 11 can be measured. The frequency meter can be calibrated in pressure units for convenience, or a frequency-to-pressure conversion graph derived experimentally.

Other similar embodiments can be constructed in which the strut 11 is stretched by applied force acting in the axial direction, for example where a pressure sensitive diaphragm arrangement has the center of the diaphragm mechanically coupled to the end of the strut 11 which is shown in FIG. 1 fixed in the bore 36, the mechanical coupling causing movement of the center of the diaphragm to be translated into stretching of the strut 11.

Also similar embodiments can be constructed in which force may stretch or compress the strut 11, for example where two pressures are arranged to act on opposite sides of the diaphragm 25 and the diaphragm is secured to the disc 34.

In other embodiments, rotatable members such as the bars 16 can be arranged to bear directly on the resilient elongate member provided that the elongate member is of sufficiently hard material. In such an arrangement it is possible to use two bars. Furthermore, where intermediate members such as the blocks 14 are provided between the rotatable members and the elongate member, as in the embodiment described with reference to the accompanying drawings, the rotatable members associated with each intermediate member may be spherical and three in number, or consist of one ball and a roller having a reduced central portion so that three-point contact is provided on the respective intermediate member.

The elongate member of an embodiment need not be a bar or rod but can be a tube instead and may have an elliptical cross section.

The means for exciting the vibrations need not be magnetic but can be for example electrostatic, or acoustic, or piezoelectric, or magnetostrictive, etc., depending upon the material from which the elongate member is formed or upon suitable adaption of the elongated member.

Furthermore, the means for providing a signal representative of the frequency of the vibration can be for example electrostatic, or capacitive, or inductive, or acoustic, or piezoelectric, or magnetostrictive, etc. depending upon the material or adaption of the elongate member.

Embodiments of the invention can be employed where a physical quantity which is to be sensed or measured can be arranged to result in a corresponding force. For example, the embodiment described with reference to the drawings, gas pressure is indirectly sensed, and other embodiments can be adapted for use in sensing or measuring liquid pressure, as in tank gauging, temperature, acceleration, displacement, etc.

Embodiments of the invention can be constructed in which in use the means for exciting transverse vibration excites the said length of the elongate member to vibrate transversely at a constant frequency a signal representative of the amplitude of the vibration then being supplied by suitable means. The amplitude of the vibration in such embodiments varies with the difference between the resonance frequency of the said length and the said constant frequency. The constant frequency is chosen to be that frequency at which there would be resonance of the said length when the elongate member is subjected to a chosen datum axial force which in the case of a stiff but resilient elongate member may be zero.

Other embodiments having means for supplying a signal representative of the amplitude of transverse vibration of the said length can be constructed in which in use the means for exciting transverse vibration excite the vibration through a range of frequency values, and a peak in the signal representative of the amplitude of the vibration is sought to identify the resonance frequency and hence obtain information relating to the axial force, if any acting on the elongate member.

I claim:

1. A transducer responsive to force comprising, an elongate vibrating member; first transverse-node-forming means at which one portion of the elongate member is fixed; second transverse-node-forming means including at least two rotatable members arranged to cooperate in preventing transverse movement of another portion of the elongate member therebetween; drive means for exciting transverse vibration of the elongate member in the length thereof between said first and second transverse-node-forming means; means for applying an axial force to said elongate member; and sensing means for supplying a signal representative of a characteristic of the said vibration, the said rotatable members being arranged to roll when the said other portion moves relative to the said one portion in the axial direction of the elongate member in response to an axially directed force applied to the elongate member.

2. A transducer as claimed in claim 1, wherein the elongate member is of uniform cross section.

3. A transducer responsive to force comprising, an elongate vibrating member of oblong cross section throughout its length; first transverse-node-forming means at which one portion of the elongate member is fixed; second transverse-node-forming means including at least two rotatable members arranged to cooperate in preventing transverse movement of another portion of the elongate member therebetween; drive means for exciting transverse vibration of the elongate member in the length thereof between said first and second transverse-node-forming means and in a plane containing the minor axis of said oblong cross section; means for applying an axial force to said elongate member; and sensing means for supplying a signal representative of a characteristic of the said vibration, the said rotatable members being arranged to roll when the said other portion moves relative to the said one portion in the axial direction of the elongate member in response to an axially directed force applied to the elongate member.

4. A transducer as claimed in claim 3, wherein the said oblong cross section is rectangular.

5. A transducer as claimed in claim 1, wherein the rotatable members are roller members which have their axis parallel to one another and lying in planes to which the axis of the elongate member is perpendicular.

6. A transducer responsive to force comprising, an elongate vibrating member; first transverse-node-forming means at which one portion of the elongate member is fixed; second transverse-node-forming means including at least two rotatable members arranged to cooperate in preventing transverse movement of another portion of the elongate member therebetween said transverse-node-forming means comprising clamping means with respective screw-threaded tightening means for independently tightening the clamping means on the respective portion of the elongate member; drive means for exciting transverse vibration of the elongate member in the length thereof between said first and second transverse-node-forming means; means for applying an axial force to said elongate member; and sensing means for supplying a signal representative of a characteristic of the said vibration, the said rotatable members being arranged to roll when the said other portion moves relative to the said one portion in the axial direction of the elongate member in response to an axially directed force applied to the elongate member.

7. A transducer as claimed in claim 6, wherein the clamping means include a frame member in which the elongate member is located and the tightening means are screw threadedly engaged.

8. A transducer responsive to force, comprising:
an elongate, flat-sided, stiff but resilient member of ferromagnetic metal;
a supporting frame for the elongate member;
a first pair of clamping members with respective flat clamping faces arranged to bear against respective opposed flat sides of the elongate member at one portion of the elongate member;
first screw-threaded tightening means screw threadedly engaged with the frame and arranged for tightening clamping action by the first pair of clamping members on the said one portion of the elongate member;
a second pair of clamping members with respective flat clamping faces arranged to bear against the said respective opposed flat sides at another portion of the elongate member;
at least four rotatable members arranged in pairs to roll on respective further flat faces of the second clamping members without sliding when the other portion moves in the axial direction of the elongate member in response to an axially directed force applied to the elongate member;
second screw-threaded tightening means screw threadedly engaged with the frame and arranged for tightening clamping action by the second clamping members on the said other portion of the elongate member;
an intermediate member disposed between the second tightening means and one pair of the rotatable members and having a flat face parallel to the respective further flat face of the second clamping member on which the said one pair of rotatable members is arranged to roll;
a drive coil mounted in the frame and arranged to operate on the elongate member intermediate the first and second clamping members;
a pickup coil mounted in the frame and arranged to operate on the elongate member intermediate the first and second clamping members;
respective cores for the drive and pickup coils; and
respective ferromagnetic containers for the drive and pickup coils, each container being arranged and shaped to form with the respective core and the elongate member a substantially closed magnetic circuit.

9. A transducer as claimed in claim 8, wherein one end of the elongate member projects beyond the second clamping members and is secured to rigid force-transmitting means.

10. A transducer as claimed in claim 8, wherein adjustable displacement-limiting means are provided on the frame for limiting displacement of the said force-transmitting means.

11. A transducer as claimed in claim 8, wherein the said force-transmitting means is rigidly secured to a pressure-responsive diaphragm.

12. A transducer as claimed in claim 8, wherein a maintaining amplifier couples the pickup coil to the drive coil.

13. A transducer as claimed in claim 12, wherein the said frame is mounted in a first protective enclosure and the amplifier is mounted in a second protective enclosure.

14. A transducer responsive to force, comprising:

a monolithic metal frame member having a channel therein;
an elongate flat-sided, stiff but resilient member of ferromagnetic metal, the elongate member being of uniform cross section and disposed in the said channel;
a pair of substantially rectangular first metal blocks respectively in contact over an area with opposite flat sides of the elongate member at one portion of the elongate member;
at least one first cap-pointed setscrew which is screw threadedly engaged with the frame member, has its point arranged to bear against one of the first metal blocks on the side thereof remote from the side thereof which is in contact with the elongate member, and has its axis lying in a plane containing the elongate member;
a pair of substantially rectangular second metal blocks respectively in contact over an area with the said opposite flat sides of the elongate member at another portion of the elongate member;
two pairs of roller members arranged to have their axes lying parallel to one another in planes to which the axis of the elongate member is perpendicular, each pair of roller members being in contact with a respective one of the second metal blocks at the side thereof remote from the side thereof which is in contact with the elongate member;
at least one substantially rectangular third metal block, the said one third metal block being arranged to have one side thereof facing the said remote side of one of the second metal blocks and in contact with the pair of roller members which is in contact with the said remote side;
at least one second cap-pointed setscrew which is screw threadedly engaged with the frame member, has its point arranged to bear against the said one third metal block on the side thereof remote from the side thereof which is in contact with the said one pair of roller members, and has its axis lying along a line which passes between the axes of the said one pair of roller members and between the axes of the other pair of roller members;
a drive coil;
a pickup coil;
respective permanent magnet cores for the drive and pickup coils;
respective ferromagnetic containers for the drive and pickup coils, each container being mounted in the frame member, extending into the said channel, and being shaped to form with the respective core and a respective portion of the elongate member a substantially closed magnetic circuit; and
a rigid force-transmitting member secured to the said other portion of the elongate member, the elongate member, the said metal blocks, and the roller members being clamped in the said channel by the said setscrews, the roller members and the said second metal blocks being spaced from the frame member to follow axial movement of the said other portion of the elongate member relative to the frame member, and a length of the elongate member, which length includes the said respective portions, extending from the first metal blocks to the second metal blocks, being sharply defined thereby, and being spaced from the frame member for transverse vibration.

15. A transducer as claimed in claim 14, wherein the other of the first metal blocks is held against the frame member in the said channel by the clamping action of the first setscrew.

16. A transducer as claimed in claim 14, wherein the elongate member is of oblong rectangular cross section, the said opposite flat sides of the elongate member are the wider side faces thereof, and the axes of the drive and pickup coils are perpendicular to the said opposite flat sides.

17. A transducer as claimed in claim 14, wherein each of the said ferromagnetic containers comprises a cylindrical shell closed at one end by a flanged base member and having a frustoconical outwardly projecting wall at the other end, the tip of the frustoconical wall having a groove therein through which the elongate member passes and to which the core of the coil extends, the said shell being located in a bore in a side wall of the said channel and the flange on the flanged base member abutting a reference outer face of the said side wall of the channel.

18. A transducer as claimed in claim 14, wherein there is a further first cap-pointed setscrew which is screw threadedly engaged with the frame member, has its points arranged to bear against one of the first metal blocks on the side thereof remote from the side thereof which is in contact with the elongate member, and has its axis lying in a plane containing the elongate member, and there is a further second cap-pointed setscrew which is screw threadedly engaged with the frame member, has its point arranged to bear against the said one third metal block on the side thereof remote from the side thereof which is in contact with the said one pair of roller members, and has its axis lying along a line which passes between the axes of the said one pair of roller members and between the axes of the other pair of roller members, the axes of the two second cap-pointed setscrews lying in a plane to which the axis of the elongate member is perpendicular and the points of contact of the two second cap-pointed setscrews with the said one third metal block being equidistant from any point on the axis of the elongate member within the said other portion of the elongate member.

19. A transducer as claimed in claim 14, wherein the elongate member and the frame member are housed in an evacuated chamber.

20. A transducer as claimed in claim 14, wherein the frame member is of a material having a coefficient of thermal expansion which compensates for thermal variations in the elongate member.

21. A transducer as claimed in claim 18, wherein the separations between the respective rollers of each of the said pairs of rollers are substantially equal and sufficiently small to prevent flexure of the said other portion of the elongate member.